Nov. 18, 1930.     D. K. RICHARDS     1,782,177
SUGAR DRIER
Filed July 19, 1929
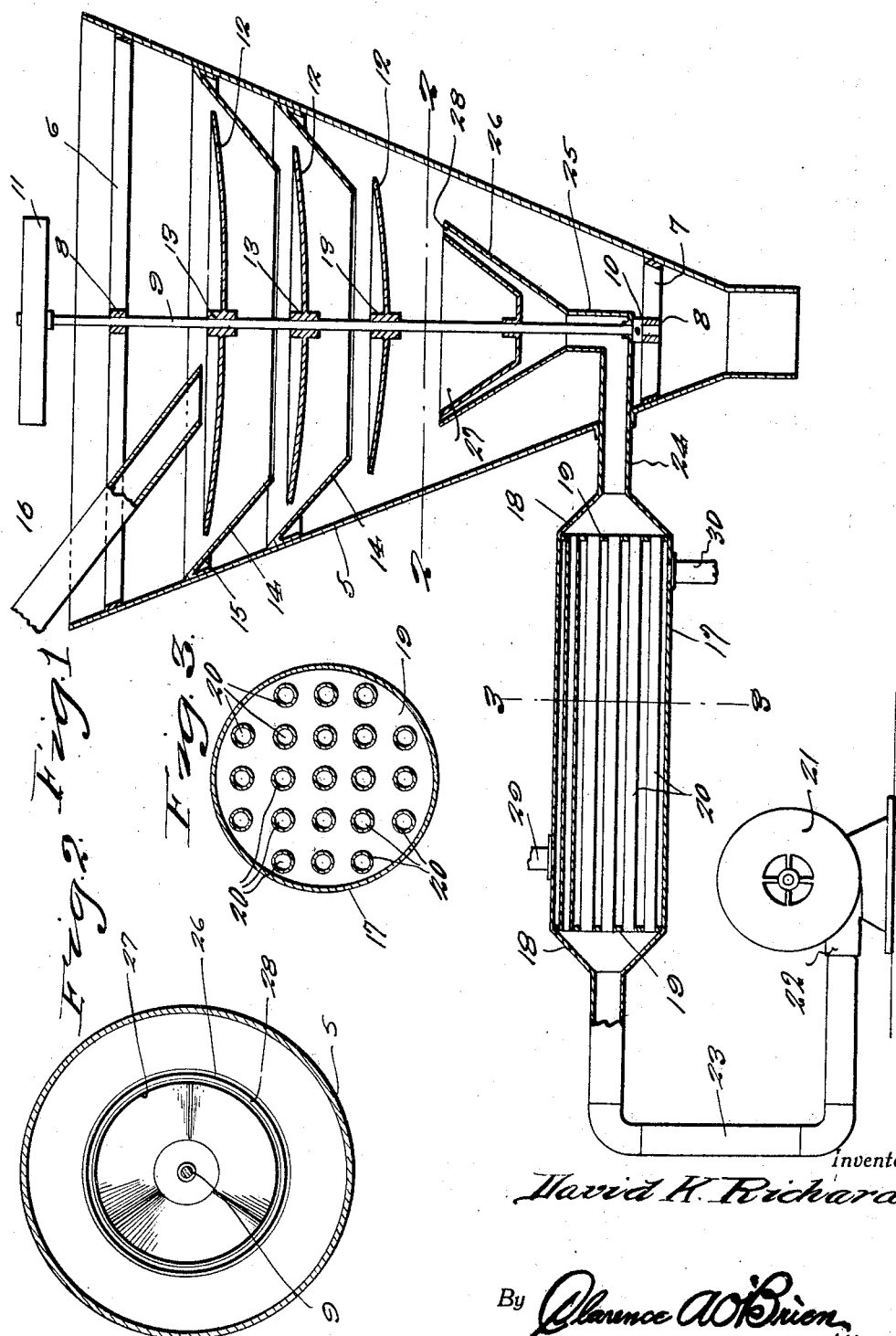
Inventor
David K. Richards
By Clarence A. O'Brien
Attorney Patented Nov. 18, 1930

1,782,177

UNITED STATES PATENT OFFICE

DAVID K. RICHARDS, OF HILO, TERRITORY OF HAWAII

SUGAR DRIER

Application filed July 19, 1929. Serial No. 379,541.

This invention appertains to new and useful improvements in drying apparatus especially adapted for drying granulated raw sugar, and this by the operation of agitating and applying heated air.

The principal object of the invention is to provide an improvement on present types of driers wherein the sugar is agitated to reduce the same from lumps to fine particles and to apply heated air while the sugar is in motion.

In the course of the following specification and claim, numerous other important objects and advantages of the invention will become apparent to the reader.

In the drawings:

Figure 1 represents a fragmentary vertical sectional view through the entire apparatus.

Figure 2 represents a horizontal sectional view taken substantially on line 2—2 of Figure 1.

Figure 3 represents a vertical sectional view through the heating drum taken substantially on line 3—3 of Figure 1.

Referring to the drawings, wherein like numerals designate like parts, it will be seen that the invention includes an inverted conical-shaped hopper 5, having spiders 6 and 7 in its upper and lower ends respectively for supporting the bearings 8 through which the vertically disposed shaft 9 is journaled. The lower end of the shaft is provided with a thrust collar 10 while the upper end thereof has a belt pulley 11 suitably secured thereto.

A plurality of concavo-convexo shaped discs 12 are secured to the shaft 9 by their hubs 13. Each overlying disc is slightly greater in diameter than its adjacent underlying disc in proportion to the increase in diameter of the conical hopper 5, as is apparent in Figure 1. Associated with the two lowermost discs 12 are the frusto-conical baffles 14, which baffles are provided with obliquely circumferentially extending flanges 15 whereby the same may be secured to the hopper 5 in a position so that the lower constricted ends are disposed over the corresponding discs 12.

Numeral 16 denotes a spout leading from a sugar supply source and terminating at its lower end immediately above the central portion of the uppermost disc 12. A drum 17 serves as a boiler with its ends constricted as at 18. Inwardly of the ends of the boiler are the heads 19 to which the ends of the air tubes 20 are secured. A blower 21 of suitable design has its outlet 22 connected to a pipe 23 leading to one end of the drum 17. The opposite end of the drum has a pipe extension 24 which leads through the lower portion of the hopper 5 and is disposed upwardly therein as at 25 in concentric relation with respect to the shaft 9. This upwardly extending portion 25 connected to a funnel-shaped head 26 within which a frusto-conical wall 27 is mounted, is of such dimension at its enlarged end as to provide a constricted fissure 28 of annular extent from which air may issue after having passed through the drum 17.

It will be seen that steam or some other heating agent may be delivered to the drum 17 through the inlet 29 and after passing through the drum may exist through the outlet 30. In passing through the drum, and around the air tubes 20, air passing from the blower 21 and through the tubes 20 will become heated and will issue from the constricted fissure 28 within the hopper 5. By reason of the specific construction of the head 26 and the disposition of the frusto-conical shell 27, the heated air will be directed toward the periphery of the lowermost disc 12.

As the sugar is deposited from the spout 16, the same will fall onto the uppermost disc 12 and by centrifugal force will fall against the adjacent baffle 14. The sugar will then slide down the baffle 14 onto the next underlying disc 12 where the foregoing operation will be repeated. As the sugar leaves the lowermost disc by centrifugal force, the heated air will filter through the falling sugar so as to thoroughly heat and absorb moisture and air therein.

Obviously, the foregoing invention provides a thorough and efficient apparatus for drying raw sugar, which in operation will save considerable time and will eliminate the necessity of providing drying apparatus independent of the usual agitating mechanism of which the present invention is also to be regarded as an improvement.

Even though the foregoing description has been in definite terms, during the manufacture of this novel mechanism, various changes may be resorted to without departing from the spirit of the invention or the scope of the appended claim.

Having thus described the invention, what is claimed as new is:

In a sugar drying apparatus, a hopper, a rotary shaft within the hopper, a disk fixed upon said shaft, and means for introducing heated air into the hopper including a funnel shaped nozzle disposed in concentric relation with respect to the shaft and positioned below the said disk, an inverted frusto-conical member nesting within said funnel shaped nozzle in circumferentially spaced relation therewith and being fixed to said shaft, said nozzle and frusto-conical member being of such relative spacing at their larger upper ends as to provide a continuous vertically discharging air outlet of annular extension and having their respective side walls of such inclination as to direct the heated air in a solid annular wall to the periphery of the said disk.

In testimony whereof I affix my signature.

DAVID K. RICHARDS.